(12) United States Patent
Lamaze et al.

(10) Patent No.: US 7,256,232 B2
(45) Date of Patent: *Aug. 14, 2007

(54) COATING PRECURSOR AND METHOD FOR COATING A SUBSTRATE WITH A REFRACTORY LAYER

(75) Inventors: Airy-Pierre Lamaze, Reaumont (FR); Christian Barthelemy, Voiron (FR); Thomas Spadone, Sao Paulo (BR); Robert Rey-Flandrin, Saint Etienne de Crossey (FR)

(73) Assignees: Aluminium Pechiney, Paris (FR); Pechiney Rhenalu, Paris (FR)

( * ) Notice: Subject to any disclaimer, the term of this patent is extended or adjusted under 35 U.S.C. 154(b) by 25 days.

This patent is subject to a terminal disclaimer.

(21) Appl. No.: 10/491,448

(22) PCT Filed: Oct. 14, 2002

(86) PCT No.: PCT/FR02/03515

§ 371 (c)(1),
(2), (4) Date: Jul. 8, 2004

(87) PCT Pub. No.: WO03/033435

PCT Pub. Date: Apr. 24, 2003

(65) Prior Publication Data

US 2004/0249039 A1    Dec. 9, 2004

(30) Foreign Application Priority Data

Oct. 15, 2001   (FR) .................................... 01 13267

(51) Int. Cl.
*C08K 3/28*     (2006.01)
*C08K 3/32*     (2006.01)

(52) U.S. Cl. ..................... 524/430; 524/414; 524/428; 524/463

(58) Field of Classification Search ................ 524/414, 524/428, 430, 463
See application file for complete search history.

(56) References Cited

U.S. PATENT DOCUMENTS

| | | | |
|---|---|---|---|
| 4,292,345 A | 9/1981 | Kolesnik et al. | |
| 4,496,469 A | 1/1985 | Morimoto et al. | |
| 5,063,267 A | 11/1991 | Hanneman et al. | |
| 5,215,801 A | 6/1993 | Wong | |
| 5,310,476 A | 5/1994 | Sekhar et al. | |
| 5,399,441 A | 3/1995 | Bearinger et al. | |
| 5,851,677 A | 12/1998 | Laurent et al. | |
| 6,210,791 B1 | 4/2001 | Skoog et al. | |

FOREIGN PATENT DOCUMENTS

| | | |
|---|---|---|
| DE | 36 38 937 | 5/1998 |
| EP | 601317 | 6/1994 |
| EP | 834489 | 4/1998 |
| EP | 994158 | 4/2000 |
| EP | 1088908 | 4/2001 |
| EP | 1197585 | 4/2002 |
| GB | 1461155 | 1/1977 |
| JP | 06 212115 | 8/1994 |
| RU | 2149168 | 5/2000 |

*Primary Examiner*—Archene Turner
(74) *Attorney, Agent, or Firm*—Dennison, Schultz & MacDonald

(57) ABSTRACT

The purpose of the invention is a coating precursor comprising a silicone resin, a mineral filler and an organic solvent capable of dissolving the said resin and putting the said mineral filler into suspension, the said silicone resin and the said mineral filler being capable of chemically reacting so as to produce a solid layer on a substrate after the organic solvent has evaporated and a cohesive refractory layer after a calcination operation. Another purpose of the invention is a method for coating a given surface of a substrate with at least one refractory layer containing silicon in which the substrate is coated with a coating precursor according to the invention so as to form a green layer and a heat treatment is carried out to calcine the said green layer and to form a cohesive refractory layer. The invention is a means of obtaining a protective coating capable of resisting oxidizing environments, liquid metal and solid or molten salt.

41 Claims, No Drawings

COATING PRECURSOR AND METHOD FOR COATING A SUBSTRATE WITH A REFRACTORY LAYER

This application is a filing under 35 USC 371 of PCT/FR02/03515 filed Oct. 14, 2002.

FIELD OF THE INVENTION

This invention relates to the protection of objects and materials for use in the metallurgical industry, and particularly the aluminium industry. In particular, it relates to protective coatings for the said objects and materials.

DESCRIPTION OF RELATED ART

The objects and materials used in the aluminium industry are frequently exposed to corrosive environments and subjected to high temperatures and severe thermal constraints. Containers (such as ladles and furnaces), ducts (such as troughs, injectors and casting nozzles) and tools and devices designed to handle and treat liquid aluminium (such as filters and rotors) must have good mechanical and chemical strength. In particular, the surfaces of these objects that are exposed to liquid aluminium must not dissolve in liquid aluminium nor contaminate it.

Although the strength of materials typically used in the aluminium industry is generally sufficient, there are some applications or conditions for which an even higher strength is required. This is the case particularly when it is required to reduce the number of inclusions per tonne of cast aluminium to almost zero.

Therefore, the applicant looked for means of handling, producing, treating and casting aluminium and liquid aluminium alloys satisfactorily under the most demanding conditions and applications.

SUMMARY OF THE INVENTION

An object of the invention is a coating precursor to be used for the formation of a protective layer on a substrate. The said precursor comprises a silicone resin and a mineral filler capable of reacting chemically with the said resin so as to produce a cohesive refractory layer after a calcination operation of the layer.

More precisely, an object of the invention is a coating precursor comprising a silicone resin (or organosiloxane), a mineral filler and an organic solvent capable of dissolving the said resin and putting the said mineral filler into suspension, the said silicone resin and the said mineral filler being capable of chemically reacting so as to produce a solid layer on a substrate after the organic solvent has evaporated and a cohesive refractory layer after a calcination operation.

The said precursor is preferably homogeneous.

DETAILED DESCRIPTION OF THE INVENTION

The silicone resin is a polysiloxane preferably comprising a proportion of OH groups, such as a polymethylsiloxane, a polydimethylsiloxane, a polymethylsilsesquioxane, or a mixture thereof, comprising a proportion of OH groups substituted for methyl groups. The applicant has noted that the proportion of OH groups is preferably between about 0.5% and about 2%. If the proportion of OH groups is too low, there will not be sufficient propension to form a solid layer after the solvent has evaporated and with good cohesiveness after calcination. A very high proportion of OH groups may make the polysiloxane difficult to produce at an acceptable cost. The silanol (Si—OH) groups are preferably stable so that the resin can be stored. These OH groups may be grafted to a polysiloxane by hydrolysis. The siloxanic patterns of the polysiloxane according to the invention are advantageously wholly or partly trifunctional or quadrifunctional.

The organic solvent is typically an apolar solvent such as a xylene or a toluene. The xylene may be a mixture of different types of xylene, such as o and p.

The mineral filler is typically chosen from among metal borides, carbides, nitrides and oxides, or from among non-metal borides, carbides and nitrides (such as boron nitrides) or a combination or a mixture thereof. The said mineral filler is advantageously chosen from among metal compounds such as metal oxides, metal carbides, metal borides and metal nitrides, or a combination or a mixture thereof. The mineral filler is preferably capable of chemically reacting with the silicone resin so as to produce a solid layer after the organic solvent has evaporated and a refractory layer with good cohesiveness after calcination of the said green layer. The mineral filler may be chosen as a function of the physicochemical characteristics expected from the coating (such as wettability or non-wettability by a liquid metal).

The metal compound is advantageously alumina, $ZrO_2$, $ZrB_2$, $TiB_2$ or $TiO_2$ or a combination or a mixture thereof. The alumina is preferably a reactive calcined alpha alumina called a technical alumina, with a very low hydration ratio (typically less than 1%, or even less than 0.5%).

The mineral filler is preferably in the form of a fine powder, which can give a fluid precursor and a uniform coating. It is typically added to the silicone resin/organic solvent mixture after a fine grinding operation. The size grading of the mineral filler powder is typically such that the size of the grains is between 0.05 μm and 50 μm.

The physical properties of the coating, such as its mechanical properties, can sometimes be adapted by adjusting the proportion of the mineral filler and/or its size grading.

According to one preferred embodiment of the invention, the precursor is typically in the form of a slurry or a slip. It is typically obtained by mixing the resin, the mineral filler and the organic solvent.

In this embodiment, the proportion of silicone resin in the precursor is typically between 5 and 30% by weight, and preferably between 7.5 and 20% by weight, to enable satisfactory ceramisation of the coating during calcination. Apart from the solvent, the proportion of silicone resin in the precursor is typically between 15 and 40% by weight.

The proportion of organic solvent in the precursor is then typically between 7.5% and 60% by weight, and preferably between 15 and 30% by weight. The solvent quantity is preferably such that all the silicone resin is dissolved and the mineral filler can be put into suspension in the solution obtained.

The proportion of the mineral filler in the precursor is typically between 30% and 75% by weight, and preferably between 45 and 70% by weight. If the proportion is too low, the deposition will be too thin and consequently it will be necessary to deposit a large number of layers in succession. If the proportion is too large, the precursor will be difficult to spread.

According to another preferred embodiment of the invention, the precursor is typically in the form of a paste.

In this embodiment, the proportion of silicone resin in the precursor is then typically between 7.5 and 20% by weight, and preferably between 10 and 17.5% by weight, to enable satisfactory ceramisation of the coating during calcination.

The proportion of organic solvent in the precursor is typically between 2.5% and 10% by weight.

The proportion of mineral filler in the precursor is typically between 70% and 95% by weight, and preferably between 75% and 90% by weight.

In this embodiment, the coating precursor advantageously includes an additive capable of reducing the viscosity of the precursor. The said additive typically comprises a dispersing agent such as stearic acid. The proportion of the said additive in the precursor is typically less than 2% by weight, and more typically between 0.1 and 1%.

The precursor is typically obtained by mixing the resin, the mineral filler and the additive, and if necessary grinding the mixture.

Another object of the invention is a method for coating a given surface of a substrate with at least one refractory layer containing silicon wherein:
- the substrate is coated with a coating precursor according to the invention so as to form a green layer;
- a heat treatment called calcination treatment is carried out to eliminate volatile materials, to calcine the said green layer and to form a cohesive refractory layer.

The applicant has observed that the method according to the invention can give a strong thin layer bonding strongly to the substrate that has good resistance to liquid metal and that has good cohesiveness.

The coating precursor may be prepared in at least two operations:
- a silicone resin is dissolved in an organic solvent so as to obtain a solution of silicone resin;
- the mineral filler is added into the solution of silicone resin thus obtained.

The substrate may be coated (typically including the deposition and spreading of the said precursor on the substrate) by any known means. For example, the coating may be deposited by brushing (typically using a brush and/or a roller), by dipping, by atomisation or by spraying (typically using a spray gun). Brushing, dipping and atomisation are particularly adapted to the deposition of precursors in the form of a slurry or slip. Spraying is particularly adapted to the deposition of precursors in the form of a paste. The temperature of the substrate may possibly be increased above the ambient temperature before coating in order to facilitate the formation of a homogeneous deposit and bonding of the deposition by melting of the resin.

The method according to the invention may also comprise complementary operations such as preparation of the parts of the substrate surface to be coated and/or drying of the green coating before the heat treatment. The said drying treatment serves in particular to evaporate the said organic solvent and, at least partially, to solidify the green layer (so that the substrate can be handled without damaging the layer). The preparation of the substrate surface typically includes cleaning and/or degreasing (for example using acetone).

In some applications, it may be advantageous to use a coating precursor also containing a wetting agent capable of facilitating the formation of a thin layer. This is the case particularly for some screen filters for which it is required to coat the wires of the metal mesh without blocking the openings. The said wetting agent is preferably a silane polyether, which encourages spreading of the coating on the substrate without preventing ceramisation of the refractory coating during the heat treatment. The chemical formula of the said silane polyether is typically:

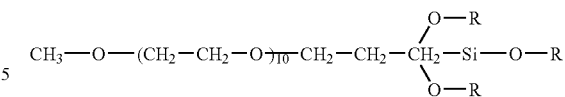

where R is an alkyl group and typically a methyl.

Advantageously, the wetting agent also prevents or significantly delays the precursor caking.

The proportion of wetting agent in the precursor is typically between about 1 and 5% by weight, and is preferably between 2 and 4% by weight for precursors in the form of a slip or a slurry and between 2 and 5% by weight for precursors in the form of a paste.

The so-called calcination heat treatment comprises at least one step at a high temperature, typically between 650 and 1300° C., and more typically between 800 and 1300° C., capable of transforming the green layer into a refractory ceramic, that is advantageously in the vitreous state. The composition of the vitreous phase typically comprises between 5 and 25% by weight of silica obtained from the resin (the remainder, typically 75 to 95% by weight, consists essentially of the mineral filler). The calcination temperature also depends on the substrate; for example, in the case of a metallic substrate, it is advantageously less than the softening temperature of the substrate. Furthermore, it is also preferable to use a calcination temperature greater than the working temperature of the coated substrate. The heat treatment may include an intermediate step at a temperature of between 200 and 600° C. (typically between 200 and 250° C.). This intermediate step is preferably capable of causing crosslinking of the resin, and possibly decomposition of the resin, before "ceramisation" (or final calcination) of the coating. In this case, it is possible, according to an advantageous variant of the invention, to continue in situ calcination heat treatment, in other words when using the substrate at high temperature (advantageously higher than 650° C.).

The duration of the heat treatment is advantageously such that it enables complete ceramisation of the precursor. The temperature increase is preferably sufficiently slow to prevent the coating from cracking.

During the heat treatment, the organic compounds are eliminated (by evaporation and/or by decomposition) leaving a refractory solid on a surface of the substrate. For example, this solid may be formed from metal originating from the metal compound and silicon originating from the silicone resin. In the case of alumina, silanol groups Si—OH of the polysiloxane seem to create covalent links with the OH groups of alumina, the said links seem to transform into Si—O—Al links with release of water, during the heat treatment to form an aluminosilicate, which is advantageously in the vitreous state. A similar mechanism may occur with metal compounds other than alumina.

The ambient atmosphere during the calcination treatment is advantageously non-oxidizing, particularly to prevent oxidation of the substrate at the substrate-coating interface that could cause decohesion between the substrate and the coating, or possibly destruction of the substrate (for example when the substrate is made of graphite).

The final coating may comprise two or more successive layers that may be applied by coatings and successive heat treatments, i.e. by successive coating/heat treatment sequences. In other words, the layer coating and calcination treatment operations are repeated for each elementary layer in the final coating. The successive layers may have a different composition, such that they have different chemical and mechanical properties. This variant provides a means of adapting each layer to a local function, such as bond to the substrate for the first layer, mechanical strength for intermediate layers and chemical resistance for the surface layer.

Another object of the invention is a substrate in which at least part of the surface comprises at least one refractory layer obtained using the said precursor or using the said coating method, the said refractory layer being advantageously in the vitreous state, with or without a gradient of the composition in the direction perpendicular to the surface of the substrate.

Another object of the invention is the use of the said precursor or the said coating method for the protection of a substrate, particularly for the protection of a material and/or a piece of equipment that will be exposed to an oxidising environment, or liquid metal (particularly aluminium, an aluminium alloy, magnesium or a magnesium alloy, in the liquid state) and/or a solid or molten salt.

The term "substrate" must be understood in the broad sense: the substrate may be made of metal (such as an iron-nickel-chromium based alloy (typically a steel or inconel)), or a refractory material or a carbonaceous material (such as graphite), or a mixture or a combination thereof; it may be a particular object (typically a piece of equipment, such as a metallic or refractory component of a casting unit, a nozzle, a liquid metal distributor in a sump, a screen made of steel (particularly stainless steel) or a refractory or ceramic material, a metallic or refractory filter, a liquid metal or gas bubbles injector, a rotor, a scraper, a pouring spout, an ultrasound sensor, a measurement sensor (ultrasound, temperature, etc.) designed to be immersed in liquid metal, parts made of carbonaceous materials, bricks made of graphite, etc.), or a material, particularly a coating material (such as a brick made of a refractory material or a carbonaceous material (such as graphite)). The substrate may be porous or non-porous.

Tests

Several tests have been carried out on different substrates. These tests were carried out using the following components:

Mineral fillers:
  a calcined alpha alumina powder (technical alumina ref. P172SB made by the Aluminium Pechiney company) with a D50 of 0.5 μm and a BET specific surface area of 6 to 8 $m^2/g$. The alumina was finely ground (size grading typically between 0.2 μm and 1.5 μm);
  a $ZrO_2$ powder (Saint Gobain reference CSO2) with a D50 of 0.8 μm and a BET of 5.5 $m^2/g$;
  a $TiO_2$ powder (Kemira reference UV Titan P 370), with a grain size of 0.06 μm;
  a $TiB_2$ powder (reference Metabap 143) with a D50 of 1.7 μm;
Silicone resin: a MK polymethylsiloxane made by the Wacker company, which is a trifunctional resin with about 1% of OH groups. This resin was composed of about 80% of silica equivalent and 20% of methyl groups, which dissociate at a temperature of the order of 450° C.;
Organic solvent: xylene;
Wetting agent: a Dynasylan® 4140 polysilane made by the Dégussa-Hüls company (about 3% by weight compared with the quantity of metal compound in all cases).
Series of Tests with Slip Several slip compositions were tested. They had the compositions given in table I (% by weight). The proportions were such that the refractory coating obtained comprised about 80% by metal compound equivalent weight (or mixture of metal compounds) and 20% by silica equivalent weight. The concentration of silicone resin in the xylene was about 250 g/l.

TABLE I

| Component | No. 1 | No. 2 | No. 3 | No. 4 | No. 5 | No. 6 |
|---|---|---|---|---|---|---|
| Alumina ($Al_2O_3$) | 44.9 | — | — | 35.9 | — | — |
| Zirconia ($ZrO_2$) | — | 44.9 | — | — | — | — |
| Titanium oxide ($TiO_2$) | — | — | 30.2 | — | — | — |
| Titanium diboride ($TiB_2$) | — | — | — | 9 | 44.9 | 66.0 |
| Silicone resin | 14 | 14 | 9.4 | 14 | 14 | 11.2 |
| Organic solvent | 39.8 | 39.8 | 59.4 | 39.8 | 39.8 | 22.8 |
| Wetting agent | 1.35 | 1.35 | 0.9 | 1.35 | 1.35 | — |

Xylene was mixed so as to obtain a homogeneous mixture. The silicone resin was dissolved at ambient temperature in this organic solvent until a homogeneous solution was obtained. If necessary, the wetting agent was then added to this solution. After a 10 minute aging time, the filler was added to this solution and mixed (by stirring) so as to obtain a homogeneous slurry.

Several tests were carried out on a 304 L stainless steel grid, as a substrate. The diameter of the wires on this grid was 100 μm and the mesh size was 200 μm.

The substrate was previously cleaned using a solvent capable of degreasing surfaces, particularly acetone. In some tests, the grid was also dipped in a caustic soda solution (for example 60 g/l at ambient temperature).

The slip was deposited in a thin layer on the substrate by painting (using a brush and a roller so as to open up the meshes). The coated substrate was then left in the open air for a few minutes so that the solvent could evaporate. It was then found that the layer dried quickly and that the deposition bonded firmly to the substrate (the deposition was very hard and uniform, and the grid could easily be handled). The percent of blocked meshes was small (typically less than 10%). After the drying operation, the substrate coated with slip was heat treated for one hour at a temperature of 900° C.

Typically, the coating was obtained by deposition and baking of four thin and successive uniform layers. Excess precursors in each deposition were removed so as to prevent the occurrence of bond defects. The final thickness of the coating was typically of the order of 50 μm. This coating was very uniform and strong (with good cohesiveness and non-powdering) and did not block up the grid openings (the mesh size was reduced only to about 100 μm).

The grids thus coated were dipped in liquid aluminium for two hours at a temperature of between 700 and 800° C. This test did not show up any deterioration to the coating.

Grids thus coated were used to filter liquid aluminium. This test showed that these grids enable circulation of liquid aluminium without any excessive pressure loss and without damage to the coating. The results obtained for initial flows on an area of the order of 13 $cm^2$ are shown in table II.

These results show that the metal flow is high with all tested slips.

TABLE II

| Slip | No. 1 | No. 2 | No. 3 | No. 4 | No. 5 |
|---|---|---|---|---|---|
| Initial flow (kg/s) | 0.011 | 0.017 | 0.045 | 0.05 | 0.19 |

The few tests carried out with a slip similar to slip No. 5, but without a wetting agent, gave results similar to those obtained with slip No. 5. Slip No. 6 gave flows similar to those obtained with slips No. 1 to 5.

Series of Tests with Paste

A paste composition was tested. Its composition was (% by weight): 82% of mineral filler (alumina), 13.9% of silicone resin and 4.1% of organic solvent. The proportions were such that the refractory coating obtained comprised about 80% of metal compound equivalent weight (or a mixture of metal compounds) and 20% by silica equivalent weight. The compositions did not include any wetting agent.

The paste obtained was deposited on a metallic substrate (a thin strip) made of 304 L stainless steel using a spatula.

After the drying operation, the coated substrate was cross-linked at a temperature of 240° C. for one hour and was then baked at a temperature of 800° C.

The final thickness of the coating was typically of the order of 200 to 300 μm. This coating was very uniform and strong (with good cohesiveness and non-powdering).

What is claimed is:

1. A coating precursor, comprising:
   a silicone resin selected from the group consisting of polymethylsiloxanes, polymethylsilsesquioxanes, and mixtures thereof, the silicone resin comprising a proportion of OH groups substituted for methyl groups between about 0.5% and about 2%,
   a mineral filler, and
   an organic solvent in which the resin is soluble and the mineral filler is suspendable,
   the silicone resin and the mineral filler producing a solid layer on a substrate after the organic solvent has evaporated, and being chemically reactive so as to produce a cohesive refractory layer on the substrate after calcining, said cohesive refractory layer containing, by weight, about 5 to 25% silica from decomposition of the silicone resin and about 75 to 95% of said mineral filler.

2. Coating precursor according to claim 1, wherein the silicone resin includes trifunctional or quadrifunctional siloxanic patterns.

3. Coating precursor according to claim 1, wherein the organic solvent is apolar.

4. Coating precursor according to claim 3, wherein the apolar organic solvent is a xylene or a toluene.

5. Coating precursor according to claim 1, wherein the mineral filler is selected from the group consisting of metal oxides, metal and non-metal carbides, metal and non-metal borides, metal and non-metal nitrides, and mixtures thereof.

6. Coating precursor according to claim 5, wherein the mineral filler comprises a calcined alpha alumina.

7. Coating precursor according to claim 5, wherein the mineral filler is selected from the group consisting of $ZrO_2$, $ZrB_2$, $TiB_2$, $TiO_2$, boron nitride, and mixtures thereof.

8. Coating precursor according to claim 1, wherein the mineral filler is in the form of a powder with a grain size between 0.05 μm and 50 μm.

9. Coating precursor according to claim 1, wherein the coating precursor also contains a wetting agent facilitating the formation of a thin layer.

10. Coating precursor according to claim 9, wherein the said wetting agent is a silane polyether.

11. Coating precursor according to claim 9, the precursor contains between 1 and 5% by weight of the wetting agent.

12. Coating precursor according to claim 1, in the form of a slurry or slip containing between 7.5% and 60% by weight of the solvent.

13. Coating precursor according to claim 12, containing between 15% and 30% by weight of the solvent.

14. Coating precursor according to claim 1, in the form of a slurry or slip containing between 5 and 30% by weight of the silicone resin.

15. Coating precursor according to claim 14, containing between 7.5 and 20% by weight of the silicone resin.

16. Coating precursor according to claim 1, in the form of a slurry or slip containing between 30% and 75% by weight of the mineral filler.

17. Coating precursor according to claim 16, containing between 45% and 70% by weight of the mineral filler.

18. Coating precursor according to claim 1, in the form of a paste containing between 2.5% and 10% by weight of the solvent.

19. Coating precursor according to claim 1, in the form of a paste containing between 10% and 17.5% by weight of the solvent.

20. Coating precursor according to claim 1, in the form of a paste containing between 7.5 and 20% by weight of the silicone resin.

21. Coating precursor according to claim 20, containing between 10 and 17.5% by weight of the silicone resin.

22. Coating precursor according to claim 1, in the form of a paste containing between 70% and 95% by weight of the mineral filler.

23. Coating precursor according to claim 22, containing between 75% and 90% by weight of the mineral filler.

24. Coating precursor according to claim 1, in the form of a paste containing an additive reducing the viscosity of the precursor.

25. Coating precursor according to claim 24, wherein the additive comprises a dispersing agent.

26. Coating precursor according to claim 25, wherein the dispersing agent is a stearic acid.

27. Coating precursor according to claim 24, wherein the precursor contains less than 2% by weight of the additive.

28. Coating precursor according to claim 27, wherein the precursor contains between 0.1 and 1% by weight of the additive.

29. Method for coating a surface of a substrate with at least one refractory layer containing silicon, comprising the steps of:
   coating the surface with a coating precursor to form a green layer, the coating precursor comprising a silicone resin selected from the group consisting of polymethylsiloxanes, polymethylsilsesquioxanes, and mixtures thereof, the silicone resin comprising a proportion of OH groups substituted for methyl groups between about 0.5% and about 2%, a mineral filler, and an organic solvent in which the resin is soluble and the mineral filler is suspendable,
   the silicone resin and the mineral filler producing a solid layer on a substrate after the organic solvent has evaporated, and being chemically reactive so as to produce a cohesive refractory layer on the substrate after calcining;

heat treating the coated surface to eliminate volatile materials from the green layer and calcining the green layer to form a cohesive refractory layer, said cohesive refractory layer containing, by weight, about 5 to 25% silica from decomposition of the silicone resin and about 75 to 95% of said mineral filler.

30. Method according to claim 29, wherein coating is deposited by brushing, by dipping or by atomization.

31. Method according to claim 29, wherein the coating precursor is in the form of a paste.

32. Method according to claim 31, wherein the coating is deposited by spraying.

33. Method according to claim 29, wherein the temperature of the substrate is increased above ambient temperature before coating.

34. Method according to claim 29, wherein said calcining comprises at least one step at a temperature of between 650 and 1300° C. capable of transforming the green layer into a refractory ceramic.

35. Method according to claim 29, wherein said heat treatment comprises an intermediate step at a temperature of between 200 and 600° C.

36. Method according to claim 29, wherein said calcining is carried out in a non-oxidizing atmosphere.

37. Method according to claim 29, wherein the refractory layer is formed from a plurality of successively deposited layers.

38. Method according to claim 29, wherein the substrate is selected from the group consisting of a metal, a refractory material, a carbonaceous material, and combinations thereof.

39. Method according to claim 38, wherein the metal is an iron-nickel-chromium based alloy.

40. Method according to claim 29, wherein the substrate is selected from the group consisting of metallic and refractory components of a casting unit, nozzles, liquid metal distributors in a sump, a screen made of steel, stainless steel, a refractory material or ceramic, metallic filters, refractory filters, liquid metal injectors, gas bubble injectors, rotors, scrapers, pouring spouts, ultrasound sensors, measurement sensors designed to be immersed in liquid metal, bricks made of refractory material, parts made of carbonaceous materials and bricks made of graphite.

41. Method according to claim 29, wherein the coating precursor is in the form of a slurry or slip.

* * * * *